United States Patent [19]

Gaxiola, Jr.

[11] Patent Number: 5,148,327

[45] Date of Patent: Sep. 15, 1992

[54] FORWARD VIEW MIRROR SYSTEM FOR BICYCLES

[76] Inventor: Miguel Gaxiola, Jr., 1352 Joyce Dr., Xenia, Ohio 45385

[21] Appl. No.: 712,566

[22] Filed: Jun. 10, 1991

[51] Int. Cl.⁵ .................. B62J 29/00; G02B 7/18; B60R 1/10

[52] U.S. Cl. .................. 359/855; 359/857; 359/865; 359/881; 280/288.4; 248/479; 248/485; 74/551.8

[58] Field of Search .......... 350/606, 612, 618, 623, 350/626, 632, 639; 248/476, 479, 481, 484, 485; 359/855, 857, 865, 872, 881; 280/288.4; 74/551.8

[56] References Cited

U.S. PATENT DOCUMENTS

| | | | |
|---|---|---|---|
| 2,137,440 | 11/1938 | Bouve | 350/618 |
| 4,375,316 | 3/1983 | Le Vantine | 350/623 |
| 4,380,369 | 4/1983 | Schacht | 350/606 |
| 4,605,289 | 8/1986 | Levine et al. | 350/632 |
| 4,715,681 | 12/1987 | Johnson | 350/632 |

FOREIGN PATENT DOCUMENTS

| | | | |
|---|---|---|---|
| 535766 | 12/1958 | Belgium | 350/623 |
| 2620406 | 3/1989 | France | 350/287 |
| 524358 | 10/1957 | Italy | 350/623 |

*Primary Examiner*—Bruce Y. Arnold
*Assistant Examiner*—R. D. Shafer
*Attorney, Agent, or Firm*—Jacox & Meckstroth

[57] ABSTRACT

A first mirror is mounted on a backing plate which is adjustably connected to the upper end portion of a first support arm, and a second mirror is mounted on a backing plate which is adjustably connected to the forward end portion of a second support arm. The opposite end portions of both the first and second support arms are adjustably connected to the forward end portion of a third support arm, and all of the support arms and backing plates are molded of a rigid plastics material. The rearward end portion of the third support arm is adjustably connected to a split collar or clamp which mounts on the handlebar support post or gooseneck of a bicycle. The mirrors and arms are individually adjustable and adjustable as a unit to accommodate bicycles of different sizes and bicycle riders of different sizes and to provide the rider with a forward and peripheral view when the rider has a comfortable head-down and streamlined position.

12 Claims, 1 Drawing Sheet

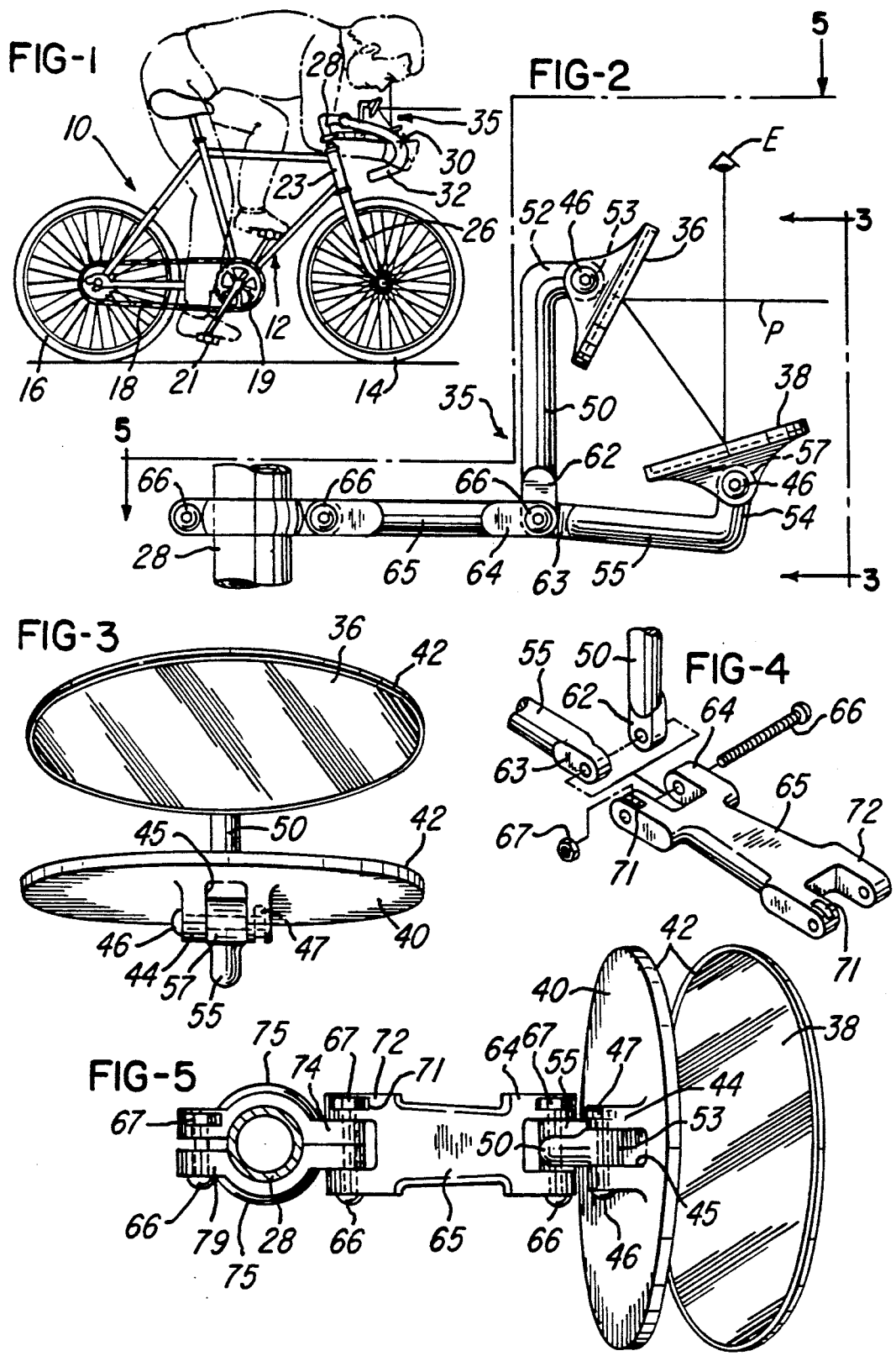

FORWARD VIEW MIRROR SYSTEM FOR BICYCLES

BACKGROUND OF THE INVENTION

When a bicycle rider is riding long distance and/or at a higher speed, for example, in a bicycle race, it is frequently desirable for the rider to assume a position where the upper part of his body or torso extends generally parallel to the road surface to obtain a streamlined position for reducing wind resistance. This position is also desirable for a long distance bicycle rider in that it permits more of the rider's body weight to be supported by the rider's arms so that all of the rider's weight is not concentrated on the bicycle seat. While riding in a streamlined position, the bicycle rider needs to tilt his head upwardly to view the path for the bicycle and to avoid any problem with an object within or close to the path. Frequently, the rider experiences neck and/or lower back pain as a result of riding a long distance with the head tilted upwardly for viewing the bicycle path.

The problem of a long distance bicycle rider having neck and/or lower back pain has been recognized for many years. For example, U.S. Pat. No. 4,375,316 discloses different forward view mirror devices for use on bicycles. However, after analyzing the different optical devices disclosed in U.S. Pat. No. 4,375,316, it is apparent that the devices do not provide certain desirable features. For example, it is desirable for a forward view mirror system to be mounted on the centerline of a bicycle and forwardly of the handlebar and its center support post or gooseneck. It is also desirable for each reflecting surface or mirror to be independently adjustable and for the two reflecting mirrors to be adjustable as a unit in order to accommodate bicycles of various sizes and riders of various sizes and enable the rider to select the optimum position for each mirror. In addition, a forward view mirror system should minimize additional wind resistance as well as minimize the weight added to the bicycle.

SUMMARY OF THE INVENTION

The present invention is directed to an improved forward view mirror system which provides all of the desirable features and advantages mentioned above. In accordance with one embodiment of the invention, a forward view mirror system includes first and second oval mirrors each of which is mounted on a protective plate of rigid plastics material and of substantially the same size as the mirror. Each of the mirror support plates has a rearwardly projecting integrally molded yoke which is adjustably connected by threaded fastener to one end portion or the short leg of a corresponding L-shaped support arm. The opposite end portions of the two mirror support arms are adjustably connected by a threaded fastener to the forward end portion of a third support arm which has an opposite or rearward end portion adjustably connected by threaded fastener to a split collar or clamp which surrounds the bicycle handlebar support post or gooseneck.

The mirror system of the invention is positioned on the center line or within the center plane of the bicycle with the second and third support arms projecting forwardly from the gooseneck and the first support arm projecting upwardly from a common adjustable connection for the three support arms. Each of the mirrors is tiltable or adjustable with respect to its support arm, each support arm is tiltable or adjustable with respect to each of the other two support arms, and the entire assembly of the mirrors, support plates and support arms is adjustable as a unit with respect to the bicycle.

Other features and advantages of the invention will be apparent from the following description, the accompanying drawing and the appended claims.

BRIEF DESCRIPTION OF THE INVENTION

FIG. 1 is a side elevational view of a bicycle having a forward view mirror system constructed in accordance with the invention and showing a bicycle rider having his upper body portion in a head-down streamlined position for using the mirror system;

FIG. 2 is a side elevational view of the mirror system shown in FIG. 1;

FIG. 3 is a front view of the mirror system, taken generally on the line 3—3 of FIG. 2;

FIG. 4 is an exploded perspective view of an adjustable connection forming part of the mirror system shown in FIG. 2; and FIG. 5 is a plan view of the mirror system, taken generally on the line 5—5 of FIG. 2.

DESCRIPTION OF THE PREFERRED EMBODIMENT

The bicycle 10 shown in FIG. 1 includes a fabricated tubular metal frame 12 supported by a front wheel 14 and a rear wheel 16 which is driven by an endless chain 18 extending around a sprocket 19 secured for rotation with a pedal crank 21. The frame 12 includes a front tubular mast 23 which rotatably supports the tubular stem of a front fork 26 which receives the front wheel 14. An inverted L-shaped support post or gooseneck 28 is secured to the stem of the front fork 26 and has an upper clamp portion which projects forwardly to support the center portion of a handlebar 30 having downwardly projecting U-shaped grip portions 32.

In accordance with the present invention, a forward view mirror system 35 includes a first oval-shaped mirror 36 and a second oval-shaped mirror 38. Each of the mirrors is preferably formed of thin glass and has a rear surface with a reflective coating and adhesively attached to internal stiffening ribs (not shown) within a corresponding support plate 40. Each plate 40 is molded of a rigid plastics material and has a thin protective rim portion 42 surrounding the corresponding mirror. Each of the mirror support plates 40 also includes an integrally molded yoke portion or center boss 44 which projects from the rear surface of the mirror and has a vertical slot 45. Each boss 44 also has a horizontal cross hole for receiving a threaded fastener in the form of a button head machine screw 46 mating with a hexagonal nut 47. One side of each of the slotted bosses 44 has a U-shaped cavity which receives the hexagonal nut 47 and prevents rotation of the nut.

Referring to FIG. 2, the upper mirror support plate 40 is supported by a first inverted L-shaped support arm 50 having an upper portion 52 with a part cylindrical end portion 53. The end portion 53 projects into the slot 46 of the boss 44, and the plate 40 is adjustably connected to the arm 50 by the screw 46. The lower mirror support plate 40 (FIG. 2) is also supported by the short leg or forward portion 54 of an L-shaped support arm 55, and the forward portion 54 has part cylindrical end portion 57 projecting upwardly into the slot 45 on the bottom side of the lower support plate 40. The lower plate 40 is adjustably connected to the arm 55 by the screw 46. Thus each of the upper and lower mirrors 36 and 38 may be pivoted or tilted in a vertical plane relative to its corresponding support arm, and after the mirror is positioned at the desired angle, the threaded fastener or screw 46 is tightened with the aid of a hexagonal Allen wrench (not shown) for clamping and securing the mirror support plate 40 to its supporting arm.

The opposite end portions of the support arms 50 and 55 include offset portions 62 and 63 (FIG. 4) which are received within a U-shaped forward yoke portion 64 of a third support arm 65 also molded of a rigid plastics material. The yoke portion 64 and offset portions 62 and 63 have aligned cross holes for receiving a threaded fastener in the form of a button head machine screw 66 and a hexagonal threaded nut 67. One side of the yoke portion 64 has a U-shaped cavity 71 for receiving and capturing the nut 67 and to prevent rotation of the nut. When the screw 66 is tightened, the offset portions 62 and 63 of the first and second support arms are rigidly clamped by the yoke portion 64 of the third support arm 65.

Referring to FIGS. 2 and 5, the third support arm 65 has a rearward yoke portion 72 which receives forwardly projecting end portions 74 of a pair of mating clamp members 75 extending around the handlebar support post or gooseneck 28. The clamp members 75 also have rearwardly projecting end portions 79, and the corresponding end portions 74 and 79 have cross holes for receiving another set of threaded fasteners in the form of button head machine screws 66 and threaded nuts 67. One of the end portions 79 and one side of the yoke portion 72 have U-shaped cavities for receiving and capturing the threaded nuts 67. When the screws 66 are tightened, the clamp members 75 grip the gooseneck 28 and the yoke portion 72 grips the forward end portions 74 to prevent the support arm 65 from pivoting in a vertical plane relative to the gooseneck 28.

All of the basic components of the mirror system, including the mirror support plates 40, the three support arms 50, 55 and 65 and the mounting clamp members 75, are molded of a rigid plastics material which may be reinforced with glass fibers to provide stiffness. Preferably, all of the plastic components are molded in a family mold where a full set of plastic components or parts are produced with each opening of the mold. The bottom of the arm 65 is also provided with cavities (not shown) to reduce the amount of material forming the arm 65.

As shown in FIGS. 1 and 2, the mirror system 35 is installed on the bicycle 10 so that the support arm 65 projects forwardly from the handlebar support post or gooseneck 28 and is located within a vertical center plane of the bicycle. The third support arm 65 has sufficient length so that the first support arm 50 projects upwardly in front of the clamp connection of the gooseneck 28 to the center portion of the handlebar 30. The support arms 50, 55 and 65 and the mirror support plates 40 are then individually and precisely adjusted according to the location of the rider's eyes E when the rider is bent forwardly and downwardly in a streamlined position as shown in FIG. 1. The mirror system 35 then provides the rider a comfortable viewing path P in a horizontal plane. After all of the arms and the mirror support plates are positioned where the rider desires, the screws 46 and 66 are tightened firmly with an Allen wrench so that the mirror system 35 remains in the precise position selected by the rider.

From the drawing and the above description, it is apparent that a forward view mirror system 35 constructed in accordance with the invention, provides desirable features and advantages. For example, one important feature is provided by the pivotal support of the support arms and the pivotal connection of each mirror support plate 40 to its supporting arm so that each mirror 36 and 38 may be independently and precisely positioned according to the size and configuration of the bicycle and the size of the bicycle rider. The mirror system 35 also provides for positioning the mirrors on the centerline or within the vertical center plane of the bicycle and forwardly of the handlebar 30 in order to accommodate a rider in a comfortable head-down and streamlined position. The plastic components of the mirror system also minimize the total weight of the system, and the mirror system 35 is streamlined so that it adds no significant air drag to the bicycle.

While the form of forward view mirror system herein described constitutes a preferred embodiment of the invention, it is to be understood that the invention is not limited to this precise form, and that changes may be made therein without departing from the scope and spirit of the invention as defined in the appended claims.

The invention having thus been described, the following is claimed:

1. In combination with a bicycle having a frame and a pair of wheels defining a center plane and a handlebar supported by a support post within the center plane, a forward view mirror system for permitting a rider to have a continuous head-down streamlined position, comprising a flat first mirror having front and rear surfaces, a first support arm having an upper end portion and a lower end portion, means including a first plate member for connecting said rear surface of said first mirror to said upper end portion of said first support arm and providing for adjustable tilting of said first mirror relative to said first support arm, a flat second mirror having front and rear surfaces, a second support arm having a forward end portion and a rearward end portion, means including a second plate member for connecting said rear surface of said second mirror to said forward end portion of said second support arm and providing for adjustable tilting of said second mirror relative to said second support arm, a third support arm having a forward end portion and a rearward end portion, first connecting means for connecting said lower end portion of said first support arm to said rearward end portion of said second support arm and to said forward end portion of said third support arm, second connecting means for connecting said rearward end portion of said third support arm to said handlebar support post and for supporting said first, second and third support arms within the center plane with said first and second mirrors extending perpendicular to the center plane, said first, second and third support arms projecting forwardly of said handlebar support post and with said first mirror positioned above and rearwardly of said second mirror, and said first and second connecting means providing for adjustably tilting said first and second support arms within the center plane.

2. The combination defined in claim 1 wherein said first connecting means comprise means defining a set of laterally extending holes within the connected corresponding said end portions of said support arms, and a threaded fastener extending through said holes perpendicular to the center plane.

3. The combination defined in claim 1 wherein said first and second plate members and said first, second and third support arms are formed of a rigid plastics material.

4. The combination defined in claim 1 wherein said second connecting means comprises a pair of mating clamp members for receiving and gripping said handlebar support post.

5. The combination defined in claim 1 wherein each of said mirrors has an oval configuration.

6. The combination defined in claim 1 wherein said second connecting means comprises a clamp member defining an opening for receiving said support post, means for rigidly securing said clamp member to said support post, and releasable means for rigidly securing said rearward end portion of said third support arm to said clamp member and providing for adjustable tilting of said third support arm within the center plane and relative to said clamp member.

7. The combination defined in claim 1 wherein each said plate member comprises a U-shaped yoke member, and a threaded fastener extending laterally through each said yoke member to provide said adjustable tilting of each said mirror.

8. The combination defined in claim 1 wherein said second connecting means comprises a pair of mating clamp members each having opposite end portions projecting form a center portion defining a cavity for receiving said support post, and a set of threaded fasteners extending laterally through corresponding said end portions of said clamp members for securing said clamp members to said post and for securing said rearward end portion of said third support arm to said clamp members.

9. In combination with a bicycle having a frame and a pair of wheels defining a center plane and a handlebar supported by a support post within the center plane, a forward view mirror system for permitting a rider to have a continuous head-down streamlined position, comprising a flat first mirror having front and rear surfaces, a first support arm having an upper end portion and a lower end portion, means including a first plate member and a laterally extending threaded fastener for connecting said rear surface of said first mirror to said upper end portion of said first support arm and providing for adjustable tilting of said first mirror relative to said first support arm, a flat second mirror having front and rear surfaces, a second support arm having a forward end portion and a rearward end portion, means including a second plate member and a laterally extending threaded fastener for connecting said rear surface of said second mirror to said forward end portion of said second support arm and providing for adjustable tilting of said second mirror relative to said second support arm, a third support arm having a forward end portion and a rearward end portion, first connecting means including a laterally extending threaded fastener for connecting said lower end portion of said first support arm to said rearward end portion of said second support arm and to said forward end portion of said third support arm, second connecting means for connecting said rearward end portion of said third support arm to said handlebar support post and for supporting said first, second and third support arms within the center plane with said first and second mirrors extending perpendicular to the center plane, said first, second and third support arms projecting forwardly of said handlebar support post and with said first mirror positioned above and rearwardly of said second mirror, and said first and second connecting means providing for adjustably tilting said first and second support arms within the center plane.

10. The combination defined in claim 9 wherein said second connecting means comprises a clamp member defining an opening for receiving said handlebar support post, and a laterally extending threaded fastener for rigidly securing said clamp member to said support post.

11. In combination with a bicycle having a frame and a pair of wheels defining a center plane and a handlebar supported by a support post within the center plane, a forward view mirror system for permitting a rider to have a continuous head-down streamlined position, comprising a flat first mirror having front and rear surfaces, a first support arm having an upper end portion and a lower end portion, means including a first plate member for connecting said rear surface of said first mirror to said upper end portion of said first support arm and providing for adjustable tilting of said first mirror relative to said first support arm, a flat second mirror having front and rear surfaces, a second support arm having a forward end portion and a rearward end portion, means including a second plate member for connecting said rear surface of said second mirror to said forward end portion of said second support arm and providing for adjustable tilting of said second mirror relative to said second support arm, a third support arm having a forward end portion and a rearward end portion, first connecting means for connecting said lower end portion of said first support arm to said rearward end portion of said second support arm and to said forward end portion of said third support arm, second connecting means including a removable clamp member surrounding said handlebar support post and a laterally extending threaded fastener for connecting said rearward end portion of said third support arm to said handlebar support post and for supporting said first, second and third support arms within the center plane with said first and second mirrors extending perpendicular to the center plane, said first, second and third support arms projecting forwardly of said handlebar support post and with said first mirror positioned above and rearwardly of said second mirror, and said first and second connecting means providing for adjustably tilting said first and second support arms within the center plane.

12. A mirror system as defined in claim 11 wherein said means for connecting each said plate member to the corresponding said support arm comprises a U-shaped yoke member formed as an integral part of said plate member, and a threaded fastener extending laterally through said yoke member and the corresponding said arm.

* * * * *